US011958081B2

(12) United States Patent
Taucher et al.

(10) Patent No.: US 11,958,081 B2
(45) Date of Patent: Apr. 16, 2024

(54) SORTING DEVICE

(71) Applicant: BINDER + CO AG, Gleisdorf (AT)

(72) Inventors: Reinhard Taucher, Kumberg (AT); Daniel Kreimer, Weiz (AT); Philipp Kober, Ilz (AT)

(73) Assignee: Binder + Co AG, Gleisdorf (AT)

( * ) Notice: Subject to any disclaimer, the term of this patent is extended or adjusted under 35 U.S.C. 154(b) by 0 days.

(21) Appl. No.: 18/200,297

(22) Filed: May 22, 2023

(65) Prior Publication Data

US 2023/0381823 A1 Nov. 30, 2023

(30) Foreign Application Priority Data

May 30, 2022 (EP) .................................... 22176180

(51) Int. Cl.
*B07C 5/36* (2006.01)
*B07C 5/342* (2006.01)

(52) U.S. Cl.
CPC ................ *B07C 5/342* (2013.01); *B07C 5/36* (2013.01)

(58) Field of Classification Search
None
See application file for complete search history.

(56) References Cited

U.S. PATENT DOCUMENTS

2015/0336135 A1* 11/2015 Corak ..................... B07C 5/367 209/509
2017/0205354 A1* 7/2017 Buckley ................ B07C 5/3425
2018/0065157 A1* 3/2018 Anup ........................ B07C 5/10
2018/0147607 A1* 5/2018 Comtois ................. B07C 5/344
2020/0360970 A1* 11/2020 Gruna .................... B65G 47/71
2022/0008959 A1* 1/2022 Miyamoto ............ B07C 5/3425
2022/0072589 A1 3/2022 Huber et al.

FOREIGN PATENT DOCUMENTS

EP 3586984 1/2020
EP 3967413 3/2022
JP 6833035 2/2021

OTHER PUBLICATIONS

Extended European Search Report conducted in counterpart Europe Appln. No. EP 221761802 (dated Oct. 27, 2022) (w/ translation).

* cited by examiner

*Primary Examiner* — Joseph C Rodriguez
(74) *Attorney, Agent, or Firm* — GREENBLUM & BERNSTEIN, P.L.C.

(57) ABSTRACT

Sorting device and method for sorting objects. The device includes a chute on which objects are movable in a conveying direction by an acting gravitational force. The chute has a cutout measuring area and a LIBS laser is positioned adjacent the cutout for spectroscopic measurement of objects moving through the cutout. A discharger for sorting out a first fraction of objects is provided along a discharge direction and below the chute and/or an imaginary extension of the chute. A control device is provided for controlling the discharger depending on measurement results of the LIBS laser. A further discharger is provided for sorting out a second fraction of objects along a further discharge direction. The further discharger is arranged above the chute and/or the imaginary extension of the chute and the control device controls the further discharger depending on the measurement results of the LIBS laser.

19 Claims, 4 Drawing Sheets

SORTING DEVICE

CROSS-REFERENCE TO RELATED APPLICATIONS

The present application claims priority under 35 U.S.C. § 119 of Europe Patent Application No. 221.76180.2 filed May 30, 2022, the disclosure of which is expressly incorporated by reference herein in its entirety.

FIELD OF INVENTION

The invention relates to a sorting device comprising

- a chute on which the objects are movable in a conveying direction by an acting gravitational force, wherein the chute has a cutout comprising a measuring area,
- a LIBS laser device positioned adjacent to the cutout of the chute to perform a spectroscopic measurement of objects moving along the chute through the cutout,
- a discharge means for sorting out a first fraction of the objects along a discharge direction, wherein the discharge means is arranged below the chute and/or below an imaginary extension of the chute, and
- a control device for controlling the discharge means depending on the measurement results of the LIBS laser device.

Furthermore, the invention relates to a method for sorting.

DESCRIPTION OF THE PRIOR ART

In the prior art, the use of LIBS (Laser Induced Breakdown Spectroscopy) in connection with sorting devices is already known. The LIBS method is used in particular in connection with the sorting of metals and ores in order to obtain a rapid analysis of the metals or ores present.

LIBS is an analytical process in which a pulsed, focused laser beam on the material surface of an object extremely heats a small area, creates a plasma, and then allows quantitative, elemental spectral analysis of the plasma.

Measuring the intensities of individual spectral lines of different elements allows conclusions to be drawn about the atomic composition of the object. The spectrum of the material recorded in this way can be used to identify materials, to determine the content of certain chemical elements or chemical compounds in the object, and to thus virtually act as a fingerprint for a certain type of object.

In order to be able to measure the objects by means of LIBS laser device in the sorting device, concave chutes are known in the prior art, on which the objects are moved, preferably by means of gravitational force, so that they move past the LIBS laser device, which is arranged below the chute. In an end region of such sorting devices, a discharge means is usually provided below the chute and/or below an imaginary extension of the chute in order to be able to discharge a fraction of the objects, see for example EP 3967413 A1.

A disadvantage of the sorting devices known from the prior art is that only a fraction of the objects can be selectively discharged.

OBJECT OF THE INVENTION

It is therefore an object of the present invention to provide a sorting device which overcomes the disadvantages of the prior art. In particular, it should be possible to use the sorting device to selectively discharge an additional fraction of the objects, while the sorting device should furthermore be designed to be space-saving and simple.

SUMMARY OF THE INVENTION

This object is solved according to the invention in a sorting device according to the invention for sorting objects comprising

- at least one chute on which the objects can be moved in a conveying direction by an acting gravitational force, wherein the chute has a cutout comprising a measuring area,
- a LIBS laser device positioned adjacent to the cutout of the chute to perform a spectroscopic measurement of objects moving along the chute through the cutout,
- a discharge means for sorting out a first fraction of the objects along a discharge direction, wherein the discharge means is arranged below the chute and/or below an imaginary extension of the chute, and
- a control device for controlling the discharge means depending on the measurement results of the LIBS laser device, in that the sorting device comprises a further discharge means for sorting out a second fraction of the objects along a discharge direction, which further discharge means is arranged above the chute and/or above the imaginary extension of the chute, wherein the control device is designed to control the further discharge means depending on the measurement results of the LIBS laser device.

A chute is understood to be an element which is arranged inclined at least in sections in an operating state and along which objects can slide by gravity alone, preferably at least in sections one after the other.

The sorting device according to the invention comprises a LIBS laser device to perform an analysis of the respective object moving past the LIBS laser device on the chute. In this regard, the LIBS laser device comprises at least one laser as well as a detector to perform the measurement of a spectrum.

With the LIBS laser device, it is possible either to merely identify the respective object via the spectrum of the individual chemical elements contained and/or to perform a quantitative analysis. This means that with the LIBS laser device it can be determined on the one hand whether the object has the previously determined material, i.e. a certain chemical element or a certain chemical compound,—i.e. whether the object is a valuable element—and on the other hand also which content of this chemical element or this chemical compound the (valuable) object has.

In order to be able to carry out the LIBS measurement, a cutout comprising a measuring area is provided in the chute. In any case, the cutout must have such dimensions that the laser beam can reach the object to perform the laser-induced plasma spectroscopy and that it is also possible to measure the plasma generated by the laser beam. The measuring area is located where the laser beam passes through the cutout in the operating state of the device. This means that the cutout either corresponds to the measuring area in terms of its size, or is larger than the measuring area. However, the measuring area determines in any case where the LIBS measurement of the objects takes place.

However, sorting downstream of the LIBS measurement only takes place if at least one measuring point of an object has a successful measurement. If there is no successful measurement, it is a so-called empty measurement and the object is not sorted out. If several measurements are available for an object, which include at least one material assignment, i.e. a valid measurement, as well as an empty measurement, an assignment for the object to a fraction can be carried out from the ratio of the number, optionally with further parameterization, of the valid measurement(s) and the empty measurements.

The sorting device according to the invention comprises a discharge means and a further discharge means, both of which are controlled automatically by means of the control device. The control device is thus able to evaluate signals or data from the LIBS laser device and, optionally, from an object recognition device (see below) and to instruct the discharge means and the further discharge means accordingly.

Usually, by means of the discharge means and the further discharge means, respective valuable fractions of the objects, which have been defined as containing a (previously determined) specific material, e.g. a specific metal or alloy, are separated from the other (non-valuable) objects, if the LIBS analysis has provided a corresponding result, wherein the result of the LIBS analysis may also contain the result of the evaluation of an optionally provided object recognition device. In this case, the first fraction of the objects differs from the second fraction of the objects in that the first fraction has, for example, a (somewhat) different alloy composition than the second fraction. This means that both the first and the second fraction are fractions of value, but differing in at least one parameter.

A fraction of value will typically comprise 1% to 90% of the objects fed to the sorting device according to the invention.

However, it is equally possible that by means of the discharge means and the further discharge means in each case a non-valuable fraction of the objects is separated from the other (valuable) objects. In this context, a non-valuable fraction is understood to be a fraction which does not contain a (previously determined) specific material, e.g. a specific metal or a specific alloy.

It is also not excluded that a valuable fraction of the objects is discharged by means of the discharge means and a non-valuable fraction of the objects is discharged by means of the further discharge means or vice versa.

Preferably, the discharge means and the further discharge means are each a blow-out means in the form of one or more discharge nozzles, from which at least one fluid stream, in particular at least one compressed air stream, emerges. In the case of a blow-out means, the discharge direction corresponds to the direction of the blow-out nozzle(s).

By means of the discharge means and the further discharge means, it is thus possible to discharge two fractions of the objects in a targeted manner. The arrangement of the further discharge means above the chute and/or above the imaginary extension of the chute is particularly advantageous, since the compact design of the sorting device can be maintained and existing sorting devices can also be adapted accordingly.

Whether valuable fractions or non-valuable fractions are sorted out is not essential in the context of the present invention—as already explained above—and may depend, for example, on which of the fractions has the greater number of objects, or is determined by qualitative aspects.

It is conceivable that the majority of the objects of the first fraction have a greater density than the majority of the objects of the second fraction. This means that the majority of the objects of the first fraction per unit volume is heavier than the majority of the objects of the second fraction per the same unit volume. This is particularly advantageous because the discharge means, in particular an outlet of the discharge means, by means of which the first fraction of the objects can be discharged, can be placed directly below the chute and/or directly below an imaginary extension of the chute, whereby less energy is required for the discharge compared to a discharge means further spaced from the chute and/or an imaginary extension of the chute, because the objects always have substantially the same distance to the discharge means, in particular to the outlet of the discharge means, regardless of their size. This is not the case with the further discharge means. In any case, the further discharge means must be spaced further from the chute or from the imaginary extension of the chute, since the objects can have different sizes and must all pass through the area between the discharge means and the further discharge means. This means that the distance between the further discharge means, in particular the outlet of the further discharge means, and the objects varies depending on the size of the objects. For objects that have a smaller diameter, the shortest distance between the respective object and the further discharge means is greater than for objects that have a larger diameter. It follows that with a greater distance between the further discharge means and the objects, correspondingly more energy is required for the discharge process. In order to be able to discharge all objects (regardless of their size), the further discharge means must therefore generally always be operated with a greater energy input.

In the sense of the invention, majority means a predominant number out of a total number of objects; i.e. more than 50%, preferably more than 70%, particularly preferably more than 90%.

It follows from the above that a (shortest) distance between the discharge means, in particular the outlet of the discharge means, and the objects thus remains essentially constant—irrespective of a size of the objects, whereas a (shortest) distance between the further discharge means, in particular the outlet of the further discharge means, and the objects is variable depending on the size of the objects.

Thus, it is advantageous if the first fraction, the majority of the objects of which have a greater density than the majority of the objects of the second fraction, can be discharged with the discharge means because, in principle, more energy is required for the discharge of objects with a greater density compared to the discharge of objects with a lower density, but this energy can be easily adjusted and reduced to a minimum if the distance between the objects to be discharged and the discharge means remains essentially constant.

Before the sorting device according to the invention runs in the operating state, it must of course be determined which of the two fractions to be sorted out is the fraction the majority of whose objects have a greater density. This is usually determined in advance—either by calculations or by experimental data.

In the case of those objects that are not discharged by means of the discharge means and the further discharge means, i.e. those objects that have not been assigned to the first fraction or the second fraction, are therefore objects that have not been sorted out.

The sorting device according to the invention is used in particular in the recycling of metal waste, wherein preferably objects such as metals, in particular aluminum alloys, are sorted out by means of the discharge means and/or by means of the further discharge means. For example, objects made of cast aluminum alloys, which usually have a high silicon content and have a greater density than objects made of wrought aluminum alloys, can be detected by the LIBS analysis on the basis of typical components (e.g., the high silicon content) and discharged with the discharge means, while objects made of wrought aluminum alloys can be detected by the LIBS analysis on the basis of typical components and discharged with the further discharge means.

Usually, those objects which are sorted out by means of the sorting device according to the invention or which pass through it are presorted. This means that before the objects are fed to the sorting device according to the invention, they pass through a presorting process in which (coarse) impurities are already sorted out. Thus, impurities in the objects are already reduced accordingly before passing through the sorting device according to the invention. Metal waste sorted by the sorting device according to the invention therefore generally does not contain objects made of glass or plastic. In particular, if objects made of different aluminum alloys are to be separated from each other, the sorting device according to the invention is preferably only fed with objects made of metal that mainly contain aluminum.

The location of the respective object on the chute, and thus its arrival at the separation device, can usually be determined by means of the LIBS measurement of the LIBS laser device: at the time of the LIBS measurement, a certain object is located in the measuring area and it can be determined when this object arrives at the discharge means or at the further discharge means. Especially in the case of continuous LIBS measurement, it would in principle also be possible to determine the length of an object by the LIBS measurement, since the frequency of the continuous LIBS measurement is known and it can be concluded from several successive LIBS measurements that it is an object with a corresponding length. However, the sorting device according to the invention can also be provided with its own object recognition device, which is designed to detect at least the position of an object on the chute, i.e. the orientation of the object relative to the chute, and additionally the shape and dimensions of the object. This means that the object recognition device can detect, for example, how the object lies relative to the measuring area and/or to the discharge means or to the further discharge means, such as whether an object lies transversely to the conveying direction. Generally, the object recognition device takes only a two-dimensional image, but it is of course not excluded that three-dimensional images are also created. The control device according to the invention for controlling the discharge means or the further discharge means would, if necessary, be controlled depending on the measurement results of the object recognition device and the LIBS laser device. The control device could also, should it be necessary, carry out an independent regulation of the discharge means or the further discharge means, e.g. of the air quantity, independently of the measurement results of the object recognition device and/or the LIBS laser device.

In particular, a VIS camera and LED and/or laser illumination can be considered as object recognition device, so that two- or three-dimensional images of the objects can be created, but of course another device for recognizing objects is not excluded from use in connection with the present invention. It is also not excluded that the object recognition device detects more parameters than just the position of an object, for example the size (length and/or width) and/or the shape and/or the color and/or spectral characteristics in the NIR range (if the object recognition device includes a NIR camera) and/or the structure and/or the height of the object. It is understood that the height can only be determined from three-dimensional images or from several two-dimensional images.

A separate object recognition device can improve the classification of the objects by providing more information about the nature of the objects. It can improve separation because the discharge means and the further discharge means can react to the position and/or the shape of the objects.

If an object recognition device is present, it can also—instead of using the LIES laser device for this purpose—determine the current location of the objects, so that the control device can calculate when this object will arrive at the discharge means or at the further discharge means.

Furthermore, the sorting device according to the invention may comprise a distance measuring device for determining the distance of the objects on the chute to the LIES laser device. With the distance measuring device, the distance of the surface of the object to be measured from the LIBS laser device can be determined before the LIBS measurement and thus deviations, as a result of uneven object surfaces, can be taken into account, whereby measurement inaccuracies can be prevented and/or the individual measurements can be selected depending on the distance.

In addition, it would also be possible for the sorting device according to the invention to have a second laser device for cleaning the objects, wherein the second laser device is arranged upstream of the LIBS laser device, as seen in the direction of conveyance of the objects, in order to be able to clean the surface of the objects before the measurement, at least in an area which is at least as large as the impact area of the LIES laser beam on the object.

In order to be able to discharge objects in the best possible targeted manner by means of the discharge means and/or the further discharge means, irrespective of their shape and/or size, it is provided in an embodiment variant of the invention that the discharge means and/or the further discharge means is displaceable parallel to the conveying direction. In a further embodiment variant of the invention, it is provided that an angle between the discharge direction of the discharge means and the conveying direction and/or an angle between the discharge direction of the further discharge means and the conveying direction is adjustable. Additionally, in a further embodiment variant of the invention, it is provided that a shortest distance between the discharge means and the chute and/or the imaginary extension of the chute and/or a shortest distance between the further discharge means and the chute and/or the imaginary extension of the chute is adjustable. This means that the discharge means and the further discharge means are adjustable independently of each other. The discharge means and/or the further discharge means can thus be displaced along the conveying direction independently of one another. Furthermore, the angles defined above and/or the distances defined above, which are normal distances, can be set independently of one another. In addition, it would also be conceivable that the air pressure of the discharge means and/or the further discharge means can be adjusted.

For example, in the case of heavy objects to be sorted out, i.e. objects with a large mass, the angle between the discharge direction of the discharge means/the further discharge means, in particular the discharge means, and the conveying direction is increased in order to be able to discharge the (heavy) objects accordingly—despite the large mass.

The shortest distance between the discharge means/further discharge means and the chute (or the imaginary extension of the chute) is usually adapted to the trajectory of the objects or to their fall parabola and/or to the maximum diameter of the objects.

Furthermore, it is conceivable that in the case of objects that are elongated when viewed in the conveying direction, the angle between the discharge direction of the discharge means/further discharge means and the conveying direction is reduced, while the angle is increased in the case of objects that are short when viewed in the conveying direction.

In order to separate the objects that have not been sorted out, the first fraction of the objects and the second fraction of the objects from each other, in a further embodiment variant of the invention it is provided that, as viewed in the conveying direction, a separating means comprising three regions is arranged downstream of the chute.

Due to the arrangement of the separating means downstream of the chute, as seen in the conveying direction, existing sorting devices can be easily retrofitted. At the same time, the compact design can be maintained, as the chute does not have to be modified.

It is conceivable that each of the three regions is a shaft-shaped area.

In a further embodiment variant of the invention, it is provided that

- a first region of the separating means is arranged, at least in sections, at a trajectory of the objects, along which trajectory the objects are movable by means of gravitational force when leaving the chute,
- the first fraction of the objects can be discharged into a second region of the separating means by means of the discharge means, and
- the second fraction of the objects can be discharged into a third region of the separating means by means of the further discharge means, wherein the majority of the objects of the first fraction have a greater density than the majority of the objects of the second fraction. As a result of this arrangement, it is provided that the objects leaving the chute (not to be sorted out) can be conveyed into the first region of the separating means without discharge means, while the first fraction of the objects can be conveyed into the second region by the discharge means and the second fraction of the objects can be conveyed into the third region by the further discharge means, wherein the first fraction of the objects and the second fraction of the objects are in each case objects to be sorted out.

This means that in this embodiment variant the objects that are not to be sorted out are movable by gravity from the chute into the first region of the separating means, while the first and second fractions of the objects are deflected from their trajectory by the discharge means and the further discharge means and are conveyed into the second and third regions of the separating means.

From the above, the first region of the separating means is located between the second and third regions of the separating means.

With regard to the advantages of discharging the first fraction, the majority of the objects of which have a greater density than the objects of the second fraction, with the discharge means, reference is made to the explanations given in connection with independent claim 1.

In a further embodiment variant of the invention, it is provided that the chute comprises at least two sections, wherein the first section, through which the objects can be moved first, is formed such that the objects moving along the first section are centered by means of gravitational force normal to the conveying direction, and the second section of the chute is formed planar, wherein the cutout comprising the measuring area is arranged in the second section of the chute. This means that the first section and the second section have a different shape of the cross-section normal to the conveying direction.

The first section is understood to be, in particular, those sections whose shape causes the objects to be conveyed to the center of the first section by the acting gravitational force transversely to the conveying direction. As a rule, objects are centered by the gravitational force if the first section has two partial conveying surfaces inclined to each other, which are part of the entire conveying surface. The inclined partial conveying surfaces, which may be straight or curved in cross-section, are usually in communication with each other at a lowest region of the chute. In a cross-section of the first section normal to the conveying direction, the lowest region of the chute corresponds to a lowest point or a lowest section.

The inclined partial conveying surfaces are generally—as viewed in a cross-section of the first section normal to the conveying direction—arranged symmetrically to one another, in particular symmetrically to a plane which is perpendicular in the operating state of the sorting device and extends in the conveying direction. However, it is not excluded that the inclined partial conveying surfaces are not arranged symmetrically with respect to each other, in that these—as viewed in a cross-section of the first section normal to the conveying direction—each have, for example, a different angle with respect to a plane which is perpendicular in the operating state of the sorting device and which extends in the conveying direction (for example, a V-shaped cross-section which is tilted to the side); or have, for example, the same angle to the plane which is perpendicular in the operating state of the sorting device and which extends in the conveying direction, but have a different length in cross-section (such as a V-shaped cross-section with side walls of unequal height); or have, for example, both different angles and different lengths in cross-section (such as a V-shaped cross-section which is tilted to the side and has side walls of unequal height). The objects are conveyed to the lowest point or region of the cross-section of the chute by the inclined partial conveying surfaces and the gravitational force acting on the objects. Therefore, as the objects slide along the conveying direction through the first section, they progressively approach the lowest point of the chute. The conveying surface is understood here as that surface of the chute on which the objects can rest due to the gravitational force.

Furthermore, it is provided that the cutout for carrying out the LIBS measurement is arranged in the second section of the chute. This ensures that, on the one hand, the objects are present in individualized form and can thus be measured one after the other, and on the other hand, it ensures that the objects always have essentially the same distance, with less dependence on object size or shape, from the LIBS laser device due to the planar design of the second section, since all support points of the objects lie in the plane of the second section. The cutout will generally be centered in the chute, equidistant from the sides of the chute.

Of course, it cannot be ruled out that some objects, due to their particular external shape, have a distance from the flat conveying surface of the second section where the laser beam impinges on them.

Furthermore, in order to enable sorting of multiple objects in parallel, a sorting device assembly comprising at least two sorting devices according to the invention is provided according to the invention, wherein the at least two sorting devices according to the invention are arranged in parallel next to each other at least in sections, wherein the at least two sorting devices preferably comprise a common control device.

The parallel arrangement makes it possible in particular to increase the sorting throughput. In principle, however, it would also be possible to sort out a plurality of different objects, such as metals or ores and/or also objects with different sizes on the individual sorting devices. It is understood that more than 2 sorting devices can be arranged next to each other, e.g. 3 or 4 or 5. In any case, it is necessary that each chute has its own cutout as well as its own LIBS laser device for LIBS measurement, otherwise the objects cannot be measured and analyzed. Furthermore, each chute should have a discharge means and another discharge means to be able to separate the objects into the fractions. It is not necessary that each sorting device has its own control device. It would therefore be conceivable for only one common control device to be provided for the sorting device assembly.

In one embodiment variant of the sorting device assembly according to the invention, it is provided that both by means of the first of the at least two sorting devices, in particular by means of the discharge means and the further discharge means of the first sorting device, as well as by means of the second of the at least two sorting devices, in particular by means of the discharge means and the further discharge means of the second sorting device, the first fraction of the objects and the second fraction of the objects can be discharged. This means that by means of each of the sorting devices the same first and the same second fraction as well as the objects not sorted out can be discharged; the at least two sorting devices thus operate according to the same sorting criteria.

In order to be able to discharge several fractions, in a further embodiment variant of the sorting device assembly according to the invention it is provided that by means of the first of the at least two sorting devices, in particular by means of the discharge means and the further discharge means of the first sorting device, the first fraction of the objects and the second fraction of the objects can be discharged, as well as by means of the second of the at least two sorting devices, in particular by means of the discharge means and the further discharge means of the second sorting device, a third fraction of the objects and a fourth fraction of the objects can be discharged.

This means that by means of the sorting devices the first, the second, the third and the fourth fraction as well as the objects not sorted out can be discharged; the at least two sorting devices thus operate according to different sorting criteria, since the four fractions usually differ from each other by at least one parameter each.

In order to sort the objects passing through the first sorting device with greater separation accuracy or in order to sort out further fractions from these, it is provided in a further embodiment variant of the sorting device assembly according to the invention that the sorting device assembly comprises a return means for returning objects from the first sorting device to a return region of the second of the at least two sorting devices, wherein the return region is located upstream of the cutout of the second of the at least two sorting devices, as viewed in the conveying direction. The returned objects thus pass through both the first of the at least two sorting devices and the second of the at least two sorting devices.

Those objects that are returned to the return region by means of the return means may be objects not sorted out on the first sorting device, or the first fraction of objects discharged on the first sorting device, or the second fraction of objects discharged on the first sorting device. Preferably, the objects that are returned are the objects not sorted out on the first sorting device.

It is understood that it is not excluded that, in addition to the objects returned by the first of the at least two sorting devices, "new" objects that have not passed through the first of the at least two sorting devices may also pass through the second of the at least two sorting devices.

In order to enable a particularly space-saving design and at the same time a particularly high efficiency of the sorting device assembly, it is provided in a further embodiment variant of the sorting device assembly according to the invention that the return means is in transport connection with one of the regions of the separating means. Thus, the objects coming from the first of the at least two sorting devices—i.e. the objects not sorted out or the first fraction of the objects or the second fraction of the objects—are returned directly to the second of the at least two sorting devices and sorted again.

In order for the sorting device assembly to be particularly economical to manufacture and simple to set up and maintain, it is provided in a further embodiment variant of the sorting device assembly according to the invention that the at least two sorting devices comprise a common control device, which control device is adapted in order to control the discharge means and the further discharge means of the first of the at least two sorting devices depending on the measurement results of the LIBS laser device of the first of the at least two sorting devices, and to control the discharge means and the further discharge means of the second of the at least two sorting devices depending on the measurement results of the LIBS laser device of the second of the at least two sorting devices.

This means that both the data of the LIBS laser device of the first of the at least two sorting devices and the data of the LIBS laser device of the second of the at least two sorting devices are fed to the common control device, which evaluates the data and, based thereon, controls the discharge means and the further discharge means of the first of the at least two sorting devices and the discharge means and the further discharge means of the second of the at least two sorting devices.

The control device usually includes a computer.

To solve the problem described at the beginning, a method is also provided for sorting objects with a sorting device according to the invention, wherein the method comprises the following steps:

arrangement of the objects on a chute to move the objects by means of gravitational force;

spectroscopic measurement of the objects using a LIBS laser device;

sorting out a first fraction of the objects by means of a discharge means arranged above the chute and/or above an imaginary extension of the chute, and a second fraction of the objects by means of a further discharge means arranged below the chute and/or below the imaginary extension of the chute.

In order to be able to discharge the fraction of objects, which has a majority of objects of a greater density, particularly efficiently, it is provided in an embodiment variant of the method according to the invention that

- the objects not sorted out fall into a first region of a separating means, which first region is arranged at least in sections on a trajectory of the objects, along which trajectory the objects are movable by means of gravitational force when leaving the chute,
- the first fraction of the objects is discharged into a second region of the separating means, and
- the second fraction of the objects are discharged into a third region of the separating means, wherein the majority of the objects of the first fraction have a greater density than the majority of the objects of the second fraction.

The method steps described above can also be carried out in a sorting device assembly comprising at least two sorting devices, which sorting devices then apply the same sorting criteria and sort out the same first and second fraction in each case.

Furthermore, it is of course not excluded that the method for sorting objects according to the invention can also be carried out with a sorting device assembly, wherein the method then comprises, for example, the following steps:

- arranging the objects on a chute of a first sorting device to move the objects by means of gravitational force;
- spectroscopic measurement of the objects by means of a LIBS laser device of the first sorting device;
- sorting out
  - a first fraction of the objects by means of a discharge means arranged above the chute of the first sorting device and/or above an imaginary extension of the chute of the first sorting device, and
  - a second fraction of the objects by means of a further discharge means arranged below the chute of the first sorting device and/or below the imaginary extension of the chute of the first sorting device;
- arranging the objects on a chute of a second sorting device to move the objects by means of gravitational force;
- spectroscopic measurement of the objects by means of a LIBS laser device of the second sorting device;
- sorting out
  - a third fraction of the objects by means of a discharge means arranged above the chute of the second sorting device and/or above an imaginary extension of the chute of the second sorting device, and
  - a fourth fraction of the objects by means of a further discharge means arranged below the chute of the second sorting device and/or below the imaginary extension of the chute of the second sorting device.

Thus, at least four different fractions could be sorted out.

Furthermore, it would be conceivable that the objects not sorted out by the first sorting device are transported to a return region of the second sorting device by means of a return means.

BRIEF DESCRIPTION OF THE FIGURES

The invention will now be explained in more detail by means of exemplary embodiments. The drawings are exemplary and are intended to illustrate the idea of the invention, but in no way to restrict it or even to reproduce it conclusively.

The drawings show as follows.

DETAILED DESCRIPTION OF THE PREFERRED EMBODIMENTS

Figure 1:
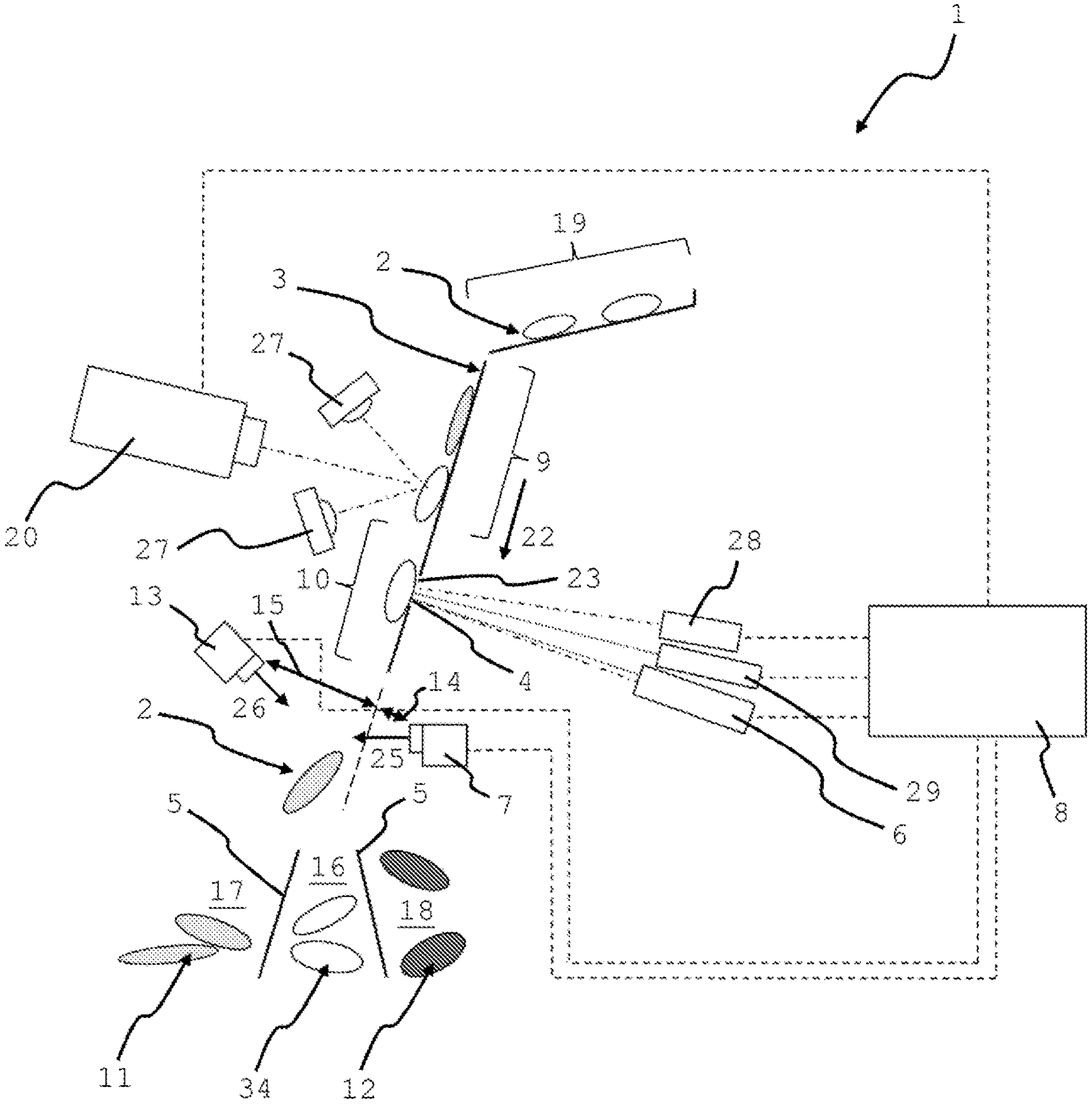
FIG. 1 shows a schematic structure of an embodiment of a sorting device according to the invention.

FIG. 1 shows a schematic structure of an embodiment of a sorting device 1 according to the invention, wherein the sorting device 1 comprises

- a chute 3 on which objects 2 are movable by the gravitational force in a conveying direction 22,
- an (optional) object recognition device 20,
- an (optional) distance measuring device 28,
- a LIBS laser device 6,
- an (optional) second laser device 29,
- a control device 8 and
- a discharge means 7 and
- a further discharge means 13.

The sorting device 1 may further comprise a device for individualizing 19 the objects 2, in this case a vibrating chute 19, which may generate a linear arrangement of individual objects 2 from a stream of objects, such that LIBS measurement of the objects 2 may be performed substantially sequentially.

The chute 3 is divided into a first section 9 and a second section 10, wherein the objects 2 are first movable through the first section 9 and only then enter the second section 10 of the chute 3. The first section 9 is formed such that the objects 2 moving along the first section 9 are centered by means of gravitational force normal to the conveying direction 22, and the second section 10 of the chute 3 is then formed flat. The second section 10 of the chute 3 has a cutout 4 comprising a measuring area 23, under which cutout 4 the LIBS laser device 6 is arranged at a distance for performing a LIBS measurement through the cutout 4. The LIBS laser device 6 comprises at least one element for generating a laser beam and a detector.

The objects 2 are thus individualized with the aid of the device for individualizing 19 and then arrive one after the other on the first section 9 of the chute 3. Each object 2 is first illuminated by the illumination 27 and thereby recognized by the object recognition device 20 or the position of the object 2 is determined and the corresponding data is transmitted to the control device 8, or controller. By means of this data, the control device 8 can calculate when the respective object 2 will be at the LIBS laser device 6 and at the discharge means 7 or at the further discharge means 13. In principle, it would also be possible for the object recognition device 20 to acquire further data of the object 2 and to provide the control device 8 with additional data about the shape, size or height of the object 2. This means that the object recognition device 20 can either create a two-dimensional image if only the position or shape of the object 2 is of interest, or create a three-dimensional image if, for example, the height of the object 2 is also relevant. The data from the object recognition device 20 can also be used to determine how long the object 2 covers the measuring area 23, i.e. how many LIBS measurements should be made of this object 2, and where the discharge means 7 or the further discharge means 13 should act on the object 2, i.e. for example which discharge nozzles of a discharge nozzle array are actuated. For example, several discharge nozzles could be actuated transversely to the conveying direction 22 if the object 2 lies transversely.

If no continuous laser radiation is emitted, it can be provided, on the one hand, that the control device 8 then gives a signal to the LIBS laser device 6 to perform a LIBS measurement as soon as the object 2 passes the cutout 4 behind or under which the LIBS laser device 6 is located, or pulsed laser radiation is emitted continuously so that the measurement is performed independently of a signal from the object recognition device 20.

As mentioned at the beginning, a second laser device 29 could be provided upstream of the LIBS laser device 6 in order to remove any contamination from the respective object 2 at least at the measuring areas on the object 2 before the LIBS measurement by the LIBS laser device 6. The LIBS laser device 6 carries out a LIBS measurement, wherein the result, i.e. the determined measurement data, is sent to the control device 8, which now in turn evaluates the measurement data and, optionally, sends a signal to the discharge means 7 or to the further discharge means 13, so that the object 2 is sorted out if it has previously defined parameters. The measurement data can be used to control or regulate the discharge means 7 or the further discharge means 13, for example adapted with regard to the shape, position or size of the respective object 2.

By means of the discharge means 7, a first fraction 11 of the objects 2 is sorted out along a discharge direction 25, and by means of the further discharge means 13, a second fraction 12 of the objects 2 is sorted out along a discharge direction 26, wherein the discharge means 7 is arranged below an imaginary extension of the chute 3 and the further discharge means 13 is arranged above an imaginary extension of the chute 3. Those objects 2 that are not sorted out by means of the discharge means 7 or the further discharge means 13 are referred to as unsorted objects 34.

In this exemplary embodiment, the objects 2 of the first fraction 11 and the second fraction 12 are each value objects 2. The objects 2 of the first and second fractions 11, 12 each contain an aluminum alloy of somewhat different alloy composition, with the majority of the objects 2 of the first fraction 11 having a greater density than the majority of the objects 2 of the second fraction 12.

The fact that the first fraction 11 of the objects 2 is sorted out by means of the discharge means 7 is advantageous in that the discharge means 7 is placed directly under an imaginary extension of the chute 3, as a result of which less energy is required for discharge in comparison with the further discharge means 13 spaced further away from the imaginary extension of the chute 3, since the objects 2 are always at essentially the same distance from the discharge means 7, irrespective of their size. When discharging objects 2 with greater density compared to discharging objects 2 with lower density, more energy is required in principle, but this energy can be easily adjusted and reduced to a minimum if the distance between the objects 2 to be discharged and the discharge means 7 remains essentially constant.

As viewed in the conveying direction 22 downstream of the chute 3, a separating means 5, or separator, comprising three regions 16, 17, 18 is arranged, wherein the first region 16 is arranged at a trajectory of the objects 2, along which trajectory the objects 2 can be moved by means of gravitational force when leaving the chute 3. In this exemplary embodiment, the objects 34 that have not been sorted out land in the first region 16. The second region 17 is arranged such that the first fraction 11 of the objects 2 sorted out by means of the discharge means 7 lands therein, while the third region 18 is arranged such that the second fraction 12 of the objects 2 sorted out by means of the further discharge means 13 lands therein. This means that both the first and the second fraction 11, 12 of the objects 2 are deflected from their trajectory by means of the discharge means 7 and the further discharge means 13, respectively, and are conveyed into the second and third regions 17, 18, respectively.

Figure 2:
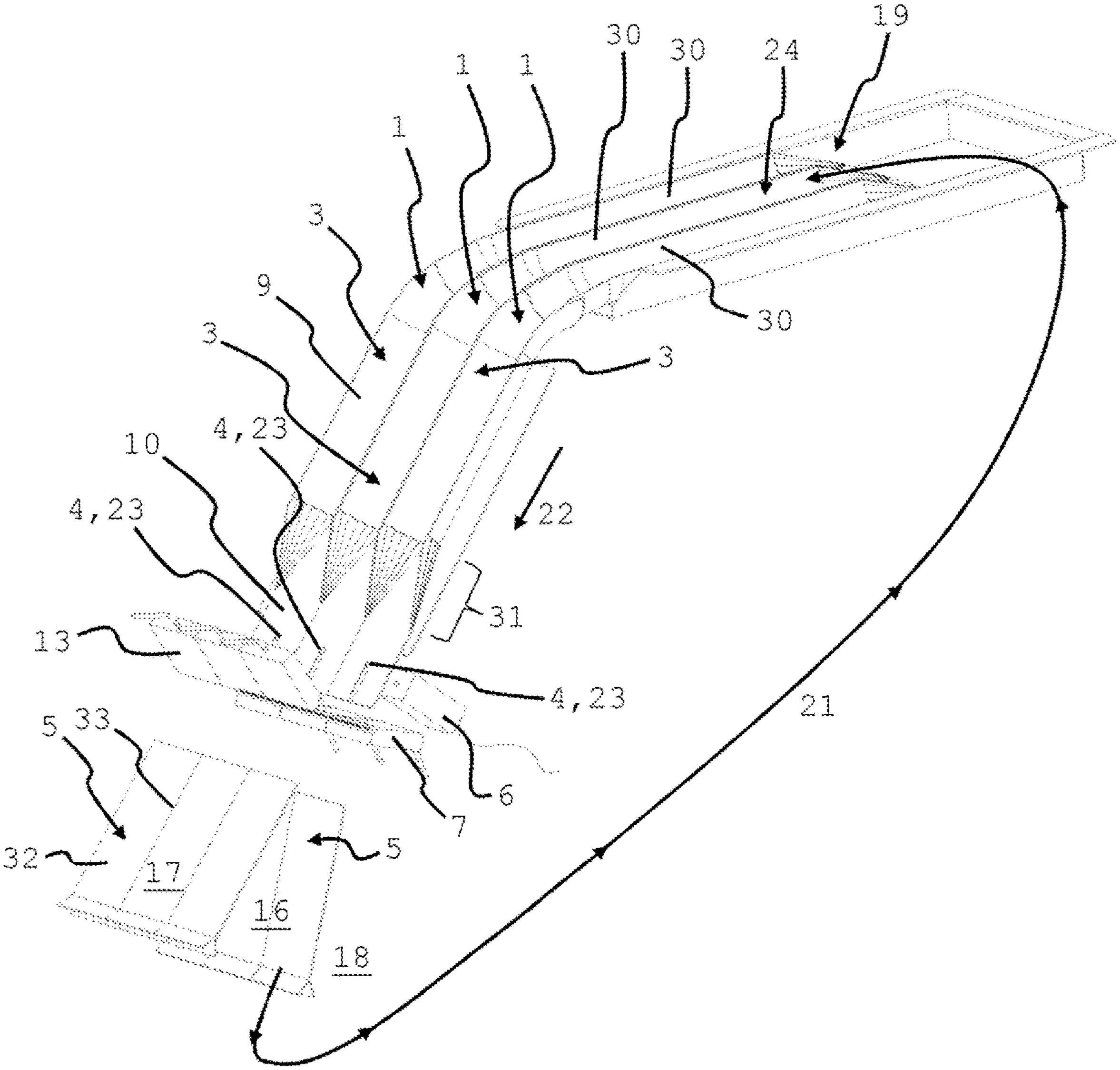
FIG. 2 shows a schematic axonometric view of an embodiment of a sorting device assembly according to the invention.

FIG. 2 represents a schematic axonometric view of an embodiment of a sorting device assembly according to the invention, which sorting device assembly comprises three similar sorting devices 1. Each of these sorting devices 1 has a chute 3 comprising a first section 9 and a second section 10. As viewed in the conveying direction 22, a device for individualizing 19 the objects 2, in the form of a vibrating chute 19 having one chute-shaped guide element 30 per chute 3, is arranged in front of the chutes 3, which guide element 30 opens into the first section 9 of a chute 3 in each case. The vibrating chute 19, and thus its guide elements 30, has or have a lower inclination than the chute 3. The vibrating chute comprises a trough to which the "new" objects 2 (if any) to be sorted out are supplied.

Objects 2 can be discharged simultaneously through the three chutes 3. Each of the chutes 3 according to the embodiment of FIG. 2 comprises a transition section 31, which enables a successive transition of the first section 9 into the second section 10, i.e. continuously transfers the cross-section of the first section 9, here semicircular, into the cross-section of the second section 10, here a flat supporting surface without side walls. Furthermore, the second section 10 of the chute 3 has a cutout 4 comprising a measuring area 23, wherein the LIBS laser device 6 is arranged at a distance from the cutout 4 for performing the measurement from below the chute 3 through the cutout 4.

Furthermore, the embodiment of FIG. 2 further shows one discharge means 7 and one further discharge means 13 per sorting device 1, which serve to discharge fractions of the objects 2. In the embodiment of FIG. 2, each discharge means 7 and each further discharge means 13 is realized by discharge nozzles and a discharge nozzle array, respectively.

By means of the embodiment of FIG. 2, the first sorting device 1 can be used to discharge two fractions 11, 12 of the objects 2 and objects 2 that have not been sorted out.

With the second sorting device 1, either

- the same two fractions 11, 12 of the objects 2 which are also discharged on the first sorting device 1, and the objects 2 which are not sorted out are discharged, or
- two fractions of the objects 2 other than those fractions 11, 12 of the objects 2 which are discharged on the first sorting device 1, and the objects 2 which are not sorted out are discharged, or
- a similar fraction 11, 12 of the objects 2 which is also discharged on the first sorting device 1, and a fraction of the objects 2 other than those fractions 11, 12 of the objects 2 which are discharged on the first sorting device 1, and the objects 2 which are not sorted out are discharged.

With the third sorting device 1, either the same two fractions 11, 12 of the objects 2 which are also discharged on the first and the second sorting device 1, and the objects 2 which are not sorted out are discharged, or two fractions of the objects 2 other than those fractions 11, 12 of the objects 2 which are discharged on the first and second sorting devices 1, and the objects 2 which are not sorted out are discharged, or a similar fraction 11, 12 of the objects 2 which is also discharged on the first or the second sorting device 1, and a fraction of the objects 2 other than those fractions 11, 12 of the objects 2 which are discharged on the first and second sorting devices 1, and the unsorted objects 2 are discharged.

As viewed in the conveying direction 22 downstream of the chutes 3, a separating means 5 comprising two baffles 32 is also arranged in this embodiment, wherein the three regions 16, 17, 18 are formed by means of the baffles 32. Side walls 33 may be provided on each of the baffles 32 (merely indicated in FIG. 2 by lines on the surfaces of the baffles 32) to laterally delimit the regions 16, 17, 18 directly downstream of each of the chutes 3, as viewed in the conveying direction 22. The side walls 33 thus ensure, for example, that objects 2 coming from the first chute 3 do not mix with objects 2 coming from the second chute 3 in the separating means 5. In this exemplary embodiment too, the first region 16, in which the unsorted objects 2 of all chutes 3 land, is arranged at a trajectory of the objects 2. The second region 17 is arranged such that the fractions of objects 2 of all chutes 3 sorted out by means of the discharge means 7 land therein, while the third region 18 is arranged such that the fractions of objects 2 sorted out by means of the further discharge means 13 land therein.

In order to be able to discharge further fractions from the objects 2 of the first sorting device 1 that have not been sorted out, it is provided in this exemplary embodiment that the sorting device assembly comprises a return means 21. The return means 21 or returner, is in transport connection with the first region 16 of the first sorting device 1 and returns the objects 2 not sorted out to a return region 24, which in this exemplary embodiment corresponds to the guide element 30 of the second sorting device 2. This means that in the second sorting device, in addition to the objects 2 "newly" fed into the trough of the vibrating chute 19, the returned objects 2 also pass through the chute 3.

No further return means 21 is provided in this exemplary embodiment; i.e., only "newly" fed objects 2 pass through the third sorting device 1.

The sorting device assembly shown in FIG. 2 comprises only one common (not shown) control device 8, which is set up to control all discharge means 7 and all further discharge means 13 depending on the measurement results of the LIBS laser devices 6.

Figure 3:
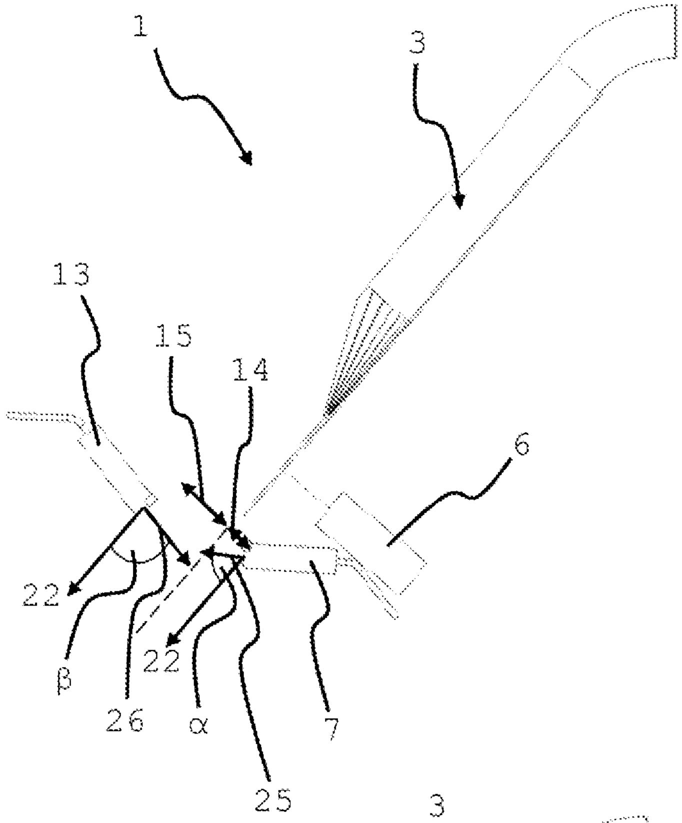
FIG. 3 shows a schematic side view of an embodiment of the sorting device according to the invention.
Figure 4:
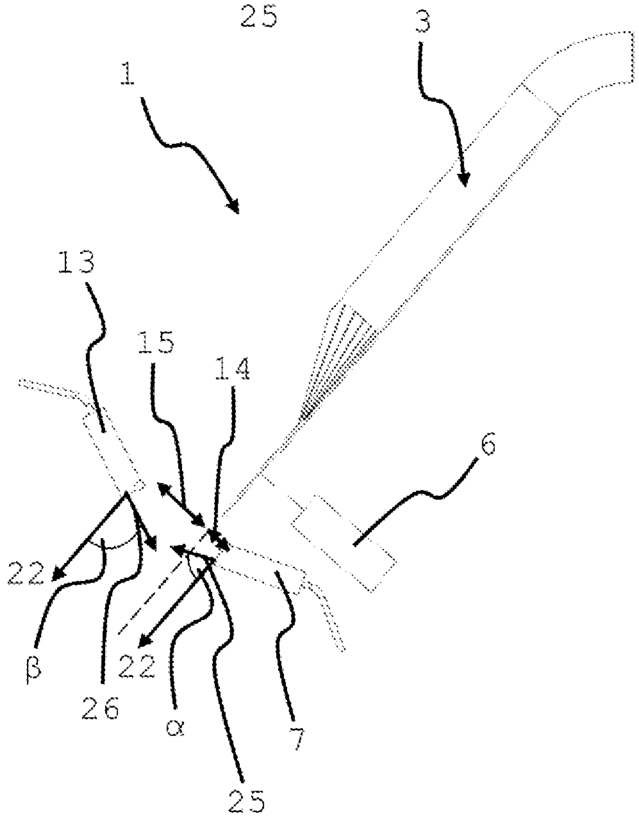
FIG. 4 shows a schematic side view of the embodiment of the sorting device according to the invention in FIG. 3, wherein one discharge means and a further discharge means are in a different position.
Figure 5:
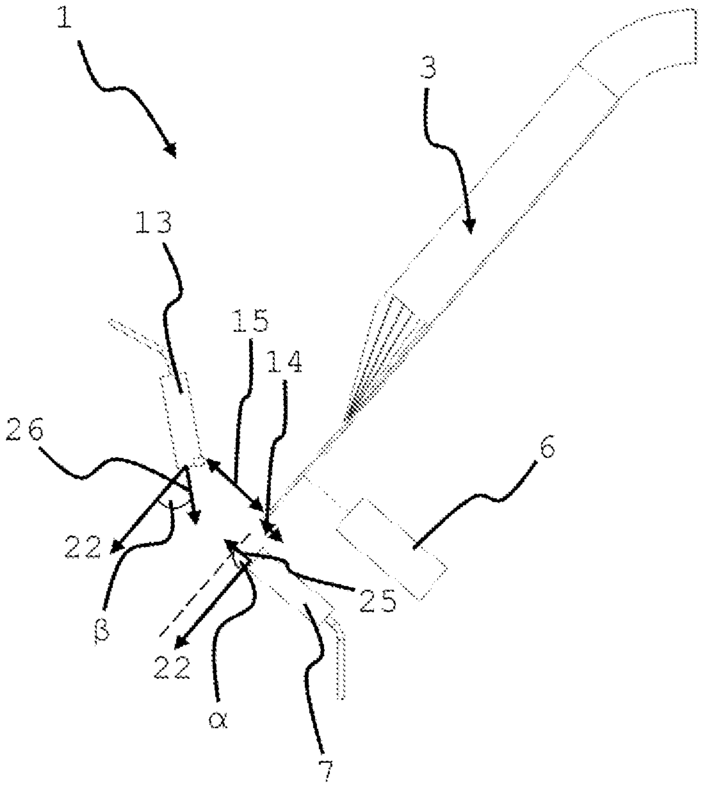
FIG. 5 shows a schematic side view of the embodiment of the sorting device according to the invention from FIG. 3 and FIG. 4, respectively, wherein the discharge means and the further discharge means are in a different position.
Figure 6:
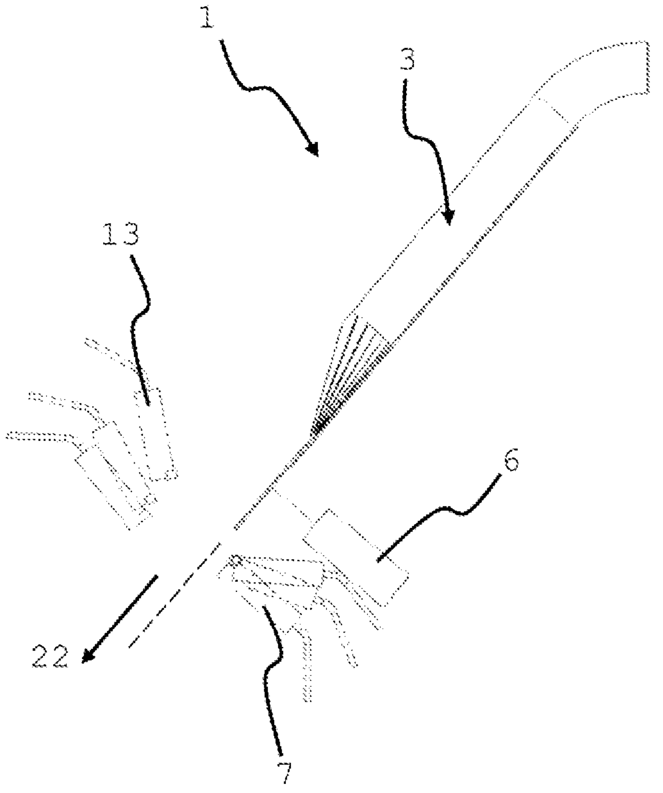
FIG. 6 shows a schematic side view of the embodiment of the sorting device according to the invention from FIG. 3, FIG. 4 and FIG. 5, respectively, wherein the positions of the discharge means and the further discharge means from FIG. 3, FIG. 4 and FIG. 5 are opposite each other.

The positions of the discharge means 7 and the further discharge means 13 can be adjusted independently of each other with respect to the chute 3 or an imaginary extension of the chute 3. This is clearly visible in FIGS. 3 to 6. FIG. 3 shows a schematic side view of an embodiment of the sorting device 1 according to the invention, while FIG. 4 shows a schematic side view of the embodiment of the sorting device 1 according to the invention from FIG. 3, wherein a discharge means 7 and a further discharge means 13 are in a different position. FIG. 5, in turn, shows a schematic side view of the embodiment of the sorting device 1 according to the invention from FIG. 3 and FIG. 4, respectively, wherein the discharge means 7 and the further discharge means 13 again are in a different position. In FIG. 6, which shows a schematic side view of the embodiment of the sorting device 1 according to the invention from FIG. 3, FIG. 4 and FIG. 5, the (different) positions of the discharge means 7 and the further discharge means 13 from FIG. 3, FIG. 4 and FIG. 5 are then compared with each other.

In this exemplary embodiment, the discharge means 7 can be rotated about a point; i.e., an angle $\alpha$ between the discharge direction 25 and the conveying direction 22 is adjustable. In this exemplary embodiment, the further discharge means 13 can again be displaced parallel to the conveying direction 22 as well as rotated by one point; i.e., an angle $\beta$ between the discharge direction 26 and the conveying direction 22 can also be adjusted here. Furthermore, in the further discharge means 13, a shortest distance 15 between the further discharge means 13 and the imaginary extension of the chute 3 can be adjusted.

The shortest distance 14 between the discharge means 7 and the imaginary extension of the chute 3 cannot be adjusted in this exemplary embodiment and is therefore constant.

For example, in the case of objects 2 with a large mass to be sorted out, the angles $\alpha$, $\beta$, in particular the angle $\alpha$, are increased in order to be able to discharge the objects 2—despite the large mass—accordingly into the second or third region 17, 18 of the separating means 5.

In FIG. 3, the angle $\alpha$ is less than 90° and is advantageous if the objects 2 are rather long when viewed in the conveying direction 22.

In FIG. 4, compared to FIG. 3, the angle $\alpha$ between the discharge direction 25 and the conveying direction 22 has been increased for the discharge means 7, while for the further discharge means 13, compared to FIG. 3, not only the angle $\beta$ has been reduced but the further discharge means 13 has additionally also been displaced in the conveying direction 22 parallel to the conveying direction 22.

In FIG. 5, compared to FIG. 4, the angle $\alpha$ of the discharge means 7 has been further increased and the angle $\theta$ of the further discharge means 13 has been further reduced. The angle $\alpha$ here is approximately 90° and is advantageous if the objects 2 are rather short when viewed in conveying direction 22. In addition, the further discharge means 13 was moved parallel to the conveying direction 22 and the distance 15 was increased.

LIST OF REFERENCE SIGNS

1 Sorting device
2 Objects
3 Chute
4 Cutout
5 Separating means
6 LIES laser device
7 Discharge means
8 Control device
9 First section of the chute 3
10 Second section of the chute 3
11 First fraction of objects 2
12 Second fraction of objects 2
13 Further discharge means
14 Shortest distance between the discharge means 7 and the chute 3
15 Shortest distance between the further discharge means 13 and the chute 3
16 First region of the separating means 5

17 Second region of the separating means 5
18 Third region of the separating means 5
19 Device for individualizing the objects 2
20 Object recognition device
21 Return means
22 Conveying direction
23 Measuring area
24 Return region
25 Discharge direction of the discharge means 7
26 Discharge direction of the further discharge means 13
27 Illumination
28 Distance measuring device
29 Second laser device
30 Guide element
31 Transition section
32 Baffle of separating means 5
33 Side wall of the separating means 5
34 Objects not sorted out
α Angle between the discharge direction 25 of the discharge means 7 and the conveying direction 22
β Angle between the discharge direction 26 of the further discharge means 13 and the conveying direction 22

The invention claimed is:

1. A sorting device for sorting objects, comprising:

a chute on which the objects are movable in a conveying direction by an acting gravitational force, wherein the chute has a cutout comprising a measuring area;

a LIBS laser device positioned adjacent to the cutout of the chute to perform a spectroscopic measurement of the objects moving along the chute through the cutout;

a blow-out element in the form of one or more discharge nozzles, from which at least one fluid stream emerges, for sorting out a first fraction of the objects along a discharge direction, wherein the blow-out element is arranged below the chute and/or below an imaginary extension of the chute; and a controller for controlling the blow-out element depending on the measurement results of the LIBS laser device;

wherein the sorting device comprises a further blow-out element in the form of one or more discharge nozzles, from which at least one fluid stream emerges, for sorting out a second fraction of the objects along a discharge direction, which further blow-out element is arranged above the chute and/or above the imaginary extension of the chute, wherein the controller is configured to control the further blow-out element depending on the measurement results of the LIBS laser device; and wherein an angle (α) between the discharge direction of the blow-out element and the conveying direction and/or an angle (β) between the discharge direction of the further blow-out element and the conveying direction is adjustable.

2. The sorting device according to claim 1, wherein:

the blow-out element and/or the further blow-out element is displaceable parallel to the conveying direction.

3. The sorting device according to claim 1, wherein:

a shortest distance between the blow-out element and the chute and/or the imaginary extension of the chute and/or a shortest distance between the further blow-out element and the chute and/or the imaginary extension of the chute is adjustable.

4. The sorting device according to claim 1, wherein:

as viewed in the conveying direction, a separator comprising three regions is arranged downstream of the chute.

5. The sorting device according to claim 4, wherein:

a first region of the separator is arranged in sections on a trajectory of the objects, along which trajectory the objects are movable by means of gravitational force when leaving the chute;

the first fraction of the objects can be discharged into a second region of separator by means of the blow-out element; and the second fraction of the objects can be discharged into a third region of the separator by means of the further blow-out element;

wherein the majority of the objects of the first fraction have a greater density than the majority of the objects of the second fraction.

6. The sorting device according to claim 4, wherein:

a first region of the separator is arranged on a trajectory of the Objects, along which trajectory the objects are movable by means of gravitational force when leaving the chute;

the first fraction of the objects can be discharged into a second region of the separator by means of the blow-out element; and the second fraction of the objects can be discharged into a third region of the separator by means of the further blow-out element;

wherein the majority of the objects of the first fraction have a greater density than the majority of the objects of the second fraction.

7. The sorting device according to claim 1, wherein:

the chute comprises at least two sections, wherein the first section, through which the objects can be moved first, is formed such that the objects moving along the first section are centered by means of gravitational force normal to the conveying direction, and the second section of the chute is formed planar, wherein the cutout comprising the measuring area is arranged in the second section of the chute.

8. A sorting device assembly, wherein at least two sorting devices according to claim 1 are arranged in parallel next to each other at least in sections.

9. The sorting device assembly according to claim 8, wherein:

the at least two sorting devices comprises a common controller.

10. The sorting device assembly according to claim 8, wherein: both by means of via the first of the at least two sorting devices, as well as by means of via the second of the at least two sorting devices; and the first fraction of the objects and the second fraction of the objects are configured to be discharged.

11. The sorting device assembly according to claim 8, wherein both by means of via the blow-out element and the further blow-out element of the first sorting device, as well as by means of via the blow-out element and the further blow-out element of the second sorting device;

the first fraction of the objects and the second fraction of the objects are configured to be discharged.

12. The sorting device assembly according to claim 8, wherein:

by means of via the first of the at least two sorting devices, the first fraction of the objects and the second fraction of the objects can be discharged, as well as the following:

by means of via the second of the at least two sorting devices, a third fraction of the objects and a fourth fraction of the objects can be discharged.

13. The sorting device assembly according to claim 8, wherein:

by means of via the blow-out element and the further blow-out element of the first sorting device, the first fraction of the objects and the second fraction of the objects can be discharged, as well as the following:

by means of via the blow-out element and the further blow-out element of the second sorting device, a third fraction of the objects and a fourth fraction of the objects can be discharged.

14. The sorting device assembly according to claim 8, wherein:

the sorting device assembly comprises a returner for returning objects from the first sorting device to a return region of the second of the at least two sorting devices, wherein the return region is located upstream of the cutout of the second of the at least two sorting devices, as viewed in the conveying direction.

15. The sorting device assembly according to claim 14, wherein:

the returner is in transport connection with one of the regions of the separator.

16. The sorting device assembly according to claim 8, wherein:

the at least two sorting devices comprise a common controller, which controller is configured in order to control the blow-out element and the further blow-out element of the first of the at least two sorting devices depending on the measurement results of the LIBS laser device of the first of the at least two sorting devices; and to control the blow-out element and the further blow-out element of the second of the at least two sorting devices depending on the measurement results of the LIBS laser device of the second of the at least two sorting devices.

17. A method for sorting objects with a sorting device according to claim 1, wherein the method comprises the following:

arranging the objects on a chute to move the objects by means of gravitational force;

spectroscopic measuring of the objects using a LIBS laser device;

sorting the following:

a first fraction of the objects by means of a blow-out element in the form of one or more discharge nozzles, from which at least one fluid stream emerges, arranged above the chute and/or above an imaginary extension of the chute; and a second fraction of the objects by means of a further blow-out element in the form of one or more discharge nozzles, from which at least one fluid stream emerges, arranged below the chute and/or below the imaginary extension of the chute; and adjusting at least one of the angle between the discharge direction of the blow-out element and the conveying direction or the angle (β) between the discharge direction of the further blow-out element and the conveying direction.

18. The method according to claim 17, wherein:

the objects not sorted out fall into a first region of a separator, which first region is arranged in sections on a trajectory of the objects, along which trajectory the objects re movable by means of gravitational force when leaving the chute:

the first fraction of the objects is discharged into a second region of the separator; and the second fraction of the objects are discharged into a third region of the separator;

wherein the majority of the objects of the first fraction have a greater density than the majority of the objects of the second fraction.

19. The method according to claim 17, wherein:

the objects not sorted out fall into a first region of a separator, which first region is arranged on a trajectory of the Objects, along Which trajectory the objects are movable by means of gravitational force when leaving the chute;

the first fraction of the objects is discharged into a second region of the separator; and the second fraction of the objects are discharged into a third region of the separator;

wherein the majority of the objects of the first fraction have a greater density than the majority of the objects of the second fraction.

* * * * *